(12) United States Patent
Ketola et al.

(10) Patent No.: US 12,545,442 B1
(45) Date of Patent: Feb. 10, 2026

(54) SWITCHABLE THERMAL LINK

(71) Applicant: Raytheon Company, Arlington, VA (US)

(72) Inventors: Kurt S. Ketola, El Segundo, CA (US); Thomas Gabor Kalman, San Pedro, CA (US); Tuan Le Duong, Santa Barbara, CA (US); Jesus Gerardo Vera, McKinney, TX (US); Scott Randall Sorbel, Manhattan Beach, CA (US)

(73) Assignee: RAYTHEON COMPANY, Arlington, VA (US)

( * ) Notice: Subject to any disclaimer, the term of this patent is extended or adjusted under 35 U.S.C. 154(b) by 0 days.

(21) Appl. No.: 19/037,895

(22) Filed: Jan. 27, 2025

(51) Int. Cl.
*B64G 1/50* (2006.01)
*B82Y 15/00* (2011.01)

(52) U.S. Cl.
CPC .............. *B64G 1/503* (2013.01); *B82Y 15/00* (2013.01)

(58) Field of Classification Search
CPC ......... B64G 1/503; B64G 1/506; B82Y 15/00
See application file for complete search history.

(56) References Cited

U.S. PATENT DOCUMENTS

| | | | | |
|---|---|---|---|---|
| 5,318,108 A | * | 6/1994 | Benson | F01N 5/02 165/96 |
| 5,332,030 A | * | 7/1994 | Spencer | F28D 15/0275 165/41 |
| 5,875,096 A | * | 2/1999 | Gates | H01L 23/4006 257/E23.09 |
| 5,957,408 A | * | 9/1999 | Hall | F28D 15/06 429/50 |
| 6,959,554 B1 | | 11/2005 | Shirron et al. | |
| 7,967,256 B2 | * | 6/2011 | Wong | B64G 1/506 244/171.8 |

* cited by examiner

*Primary Examiner* — Brian M O'Hara
(74) *Attorney, Agent, or Firm* — CANTOR COLBURN LLP

(57) ABSTRACT

An apparatus for transmitting heat from a component side to a radiator side on a spacecraft includes a component side that contains a heater, an electrical component, an optional first conduction link, and a first portion of a switchable thermal link and a radiator side that includes a radiator, an optional second conduction link and a second portion of a switchable thermal link. The first portion of the switchable thermal link and the second portion of the switchable link are in operative thermal communication with the component side and the radiator side respectively. The first portion of the switchable thermal link and the second portion of the switchable thermal link are reversibly attachable and detachable. The switchable thermal link is operative to receive and radiate thermal energy from the component side to the radiator side.

19 Claims, 11 Drawing Sheets

SWITCHABLE THERMAL LINK

BACKGROUND

This disclosure relates to a switchable thermal link for use in spacecraft.

Various flight vehicles, such as satellites and spacecraft that are deployed in space, have highly-constrained size, weight, and power (SWaP) limitations. For example, the design of a satellite has certain limitations placed on the size, weight, and power to ensure its proper delivery into a desired orbit and to ensure proper operation of the satellite once deployed. These limitations can make packaging electronics into a flight vehicle challenging. Among other things, a system-level thermal budget identifies the maximum amount of thermal energy (heat) that can be generated by components (e.g., electronics) in a flight vehicle and removed by a thermal management system of the flight vehicle. The thermal budget can therefore limit the payload carried by the flight vehicle and the power density of those electronics.

Various thermal management systems for use in flight vehicles have been proposed. Some thermal management systems support passive heat dissipation, such as, for example, by sinking waste heat into a static single wall that then functions as a radiator. Optionally, passively-deployed tape spring hinges can be used to actuate or deploy the radiator in order to increase the surface area of the radiator. Other thermal management systems actively increase the surface area of a radiator. This can be accomplished using harnessing, electronics, electrical power, actuators/motors, and high thermal conductivity interconnects. Unfortunately, these approaches tend to occupy a significant amount of space, which can reduce the amount of payload carried by a flight vehicle. Variable emissivity coatings for spacecraft thermal control are intended to be applied to the external space-facing thermal radiator surfaces, in which case they are exposed to potentially harmful effects of the space environment including radiation, atomic oxygen, micrometeorites, and the like.

SUMMARY

According to an embodiment, an apparatus for transmitting heat from a component side to a radiator side on a spacecraft includes a component side that contains a heater, an electrical component, an optional first conduction link and a first portion of a switchable thermal link and a radiator side that includes a radiator, an optional second conduction link and a second portion of a switchable thermal link. The first portion of the switchable thermal link and the second portion of the switchable link are in operative thermal communication with the component side and the radiator side respectively. The first portion of the switchable thermal link and the second portion of the switchable thermal link are reversibly attachable and detachable. The switchable thermal link is operative to receive and radiate thermal energy from the component side to the radiator side.

According to another embodiment, the switchable thermal link includes one or more interlocking fins which include component side fins that interlock with radiator side fins, and the component side fins and the radiator side fins are separated by a gap.

According to another embodiment, the one or more interlocking fins include a variable emissivity coating on a surface of the one or more interlocking fins.

According to another embodiment, the gap is more than 10 micrometers.

According to another embodiment, the gap further comprises one or more thermal insulative spacer to keep the fins from touching.

According to another embodiment, the variable emissivity coating is a nanostructured material.

According to another embodiment, the nanostructured material includes a dielectric or semi-metallic material layer, and a metal-insulator transition material layer respectively interleaved between successive dielectric layers, between successive semi-metallic material layers, or between a dielectric layer and a semi-metallic layer.

According to another embodiment, each metal-insulator transition material layer and each dielectric or semi-metallic material layer of each nanostructure has a cross-sectional shape characterized in that a change in an electrical property of at least one of the dielectric material layers, the semi-metallic material layer or the metal-insulator transition material layer occurs upon exposure to a temperature change.

According to another embodiment, the nanostructured material exhibits a first emissivity at a first temperature and a second emissivity exceeding the first emissivity at a second temperature exceeding the first temperature.

According to another embodiment, a metal-insulator transition material of the metal-insulator transition material layer includes at least one of vanadium oxide, tungsten oxide, titanium dioxide, molybdenum oxide, and a combination thereof.

According to another embodiment, the operative communication includes emissive communication by the thermal radiation.

According to another embodiment, a flight vehicle includes the apparatus.

According to another embodiment, a method for transmitting heat from a component side to a radiator side in a space vehicle includes a component side that contains a heater, an electrical component, an optional first conduction link, and a first portion of a switchable thermal link, and a radiator side that includes a radiator, an optional second conduction link, and a second portion of the switchable thermal link. The first portion of the switchable thermal link and the second portion of the switchable link are in operative thermal communication with the component side and the radiator side respectively. The first portion of the switchable thermal link and the second portion of the switchable thermal link are reversibly attachable and detachable. The switchable thermal link is operative to receive thermal energy from a component side, transmit the thermal energy to the radiator side, and the radiator radiates heat from the radiator side into space.

According to another embodiment, the method includes that the operative communication includes emissive communication by thermal radiation.

According to another embodiment, the method includes that the switchable thermal link includes one or more interlocking fins which include component side fins that interlock with radiator side fins, and the component side fins and the radiator side fins are separated by a gap.

According to another embodiment, the method includes that the one or more interlocking fins include a variable emissivity coating on a surface of the one or more interlocking fins.

According to another embodiment, the method includes that the variable emissivity coatings is a nanostructured material, and the nanostructured material exhibits a first emissivity at a first temperature and a second emissivity exceeding the first emissivity at a second temperature exceeding the first temperature.

According to another embodiment, the method includes that the nanostructured material includes a dielectric or semi-metallic material layer; and a metal-insulator transition material layer respectively interleaved between successive dielectric layers, between successive semi-metallic material layers, or between a dielectric layer and a semi-metallic layer.

According to another embodiment, the method includes that each metal-insulator transition material layer and each dielectric or semi-metallic material layer of each nanostructure has a cross-sectional shape characterized in that a change in an electrical property of at least one of the dielectric material layers, the semi-metallic material layer or the metal-insulator transition material layer occurs upon exposure to a temperature change.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
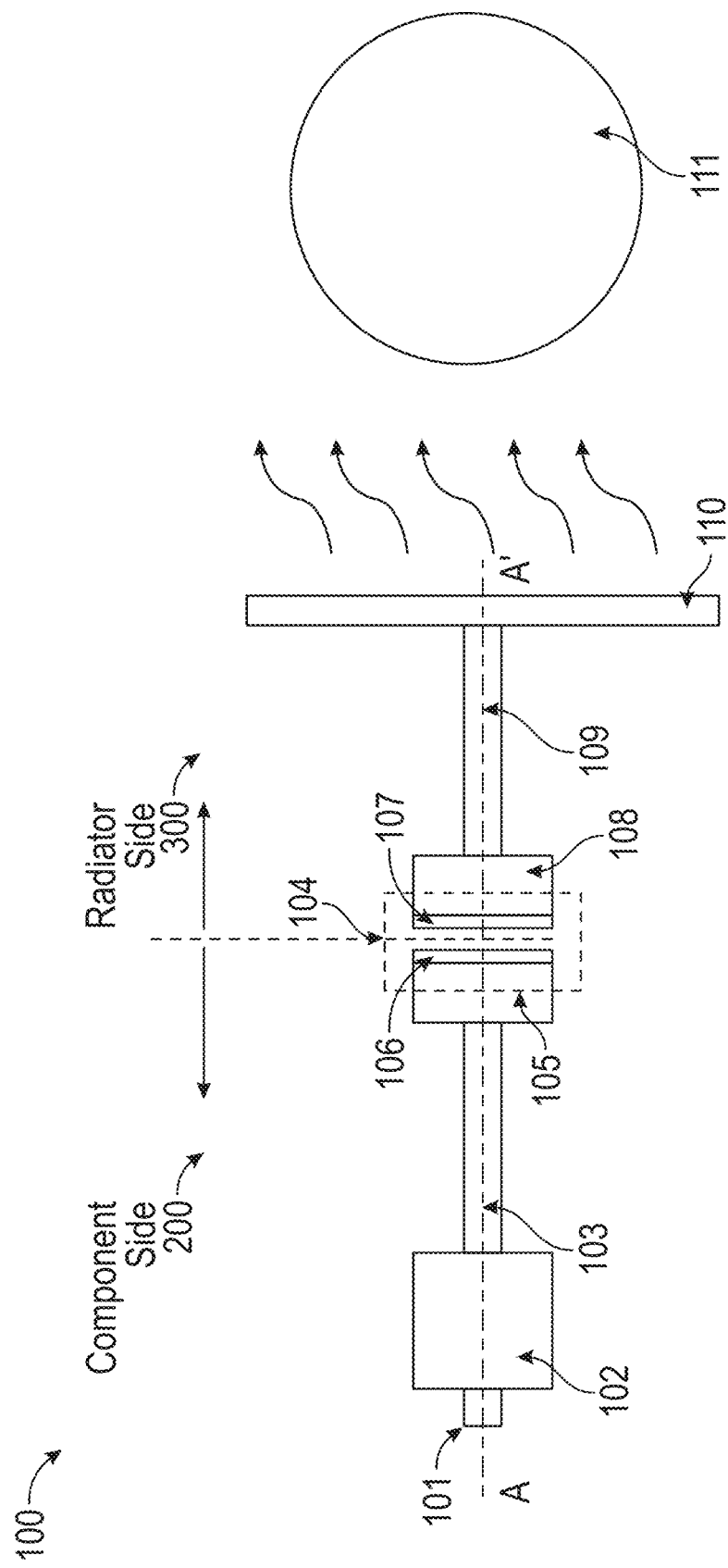
FIG. 1 is a schematic of an exemplary apparatus that includes the thermally switchable link.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

Disclosed herein is a system and a method for receiving and radiating thermal energy from a component side to a radiator side in a spacecraft. The system comprises a heater in thermal communication with an electrical component. The electrical component is in thermal communication with a switchable thermal link through a first optional conduction link. The switchable thermal link lies downstream of the first optional conduction link and is used to transfer heat to the radiator side. The radiator lies downstream of the switchable thermal link and receives the heat from the switchable thermal link through a second optional conduction link. The radiator rejects heat to the cold object, which could be space for example.

The switchable thermal link comprises a component side and a radiator side. Each side has a series of fins that interlock but are not in direct physical contact with each other such that a gap is formed between the fins on the component side and the fins on the radiator side. In one embodiment, this gap allows heat to be transferred radiantly. In another embodiment, this gap prevents the loss of heat due to thermal conduction. A variable emissive coating is applied to the component side fins and/or the radiator side fins. The coating is used to switch emissivity of the fins based on a transition temperature.

The variable emissive coatings on the fins are used to modulate the heat transfer by radiation. The fin structure can be tailored based on the number of fins, the height, width, length and the variable emissivity to obtain the desired heat transfer. The switchable thermal link provides improved performance in regulating spacecraft temperatures and reducing the loss of survival heater power by controlling the heat transfer between heat generation sources and thermal radiators which reject heat to space.

The system may be advantageously used in flight vehicles because the size, weight, and power limitations of the heater or radiator can be reduced thereby increasing the amount of payload carried by the flight vehicle. Further, the variable emissivity coatings are moved from the external surfaces of the spacecraft to the internal surfaces removing the coatings from the harmful effects of the space environment.

FIG. 1 illustrates an exemplary system 100 that contains a switchable thermal link 104 that facilitates a transfer of thermal energy from a component side 200 to a radiator side 300. As shown in FIG. 1, the component side 200 includes a survival heater 101 in operative communication with an electrical component 102. In an embodiment, the operative communication includes thermal communication. The survival heater 101 is used to keep the temperature of the electrical component 102 above the minimum survival temperature of the electrical component.

The electrical component 102 is in thermal communication with the component side 200 of the switchable thermal link 104 through an optional first conduction link 103. The switchable thermal link 104 is in thermal communication with an optional second conduction link 109 and a radiator 110 on the radiator side 300. Radiator 110 is used to reject excess waste heat created on the spacecraft to space.

The heater 101 can comprise a patch heater, a cartridge heater, a positive temperature coefficient (PTC) heater, a radioisotope heater unit, a resistive heater, or may comprise circuitry that generates thermal energy. The heater 101 can be used with thermostats or solid-state controllers to provide exact temperature control of a particular component.

The electrical component 102 may comprise any suitable electronic module including circuit breakers, switches, batteries, power control units, power distribution units, communication systems, including transmitters, receivers, antennas, onboard processors, memory units, sensors, actuators, thrusters, control systems, data handling, and energy storage units. The electrical component 102 may generate waste heat.

The first and second conduction links 103 and 109 may have a suitable structure configured to transport thermal energy between different regions or components. The conduction links can comprise straps, rods, cable, fibers, pipes, actuators, shafts, conduits, channels, wires, or plates. Alternatively, the conduction links may utilize other high performance thermal technologies such as active liquid loops or two-phase devices such as vapor chambers, heat pipes and the like. The links may be joined together to other components in any suitable manner, such as via the use of butt joints or other joints that can be formed through laser welding, brazing, friction stir welding, ultrasonic welding, or other suitable techniques. The joining means may also comprise adhesives, clips, snaps and pins. The conduction links may be formed as an integral structure between the component and the switchable thermal link.

Materials used in the first and second conduction links 103 and 109 include thermally conductive materials such as, for example, aluminum, aluminum nitride, beryllia, boron arsenide, boron nitride, cubic boron nitride, copper, diamond, germanium, gold, silver, carbon fibers, graphite, silicon carbide, tungsten, copper, steel, nickel, silica, alumina, minerals and magnesium oxide, an alloy or a combination thereof. These materials can be used in composites to increase the thermal conductivity of the polymers, epoxies, plastics, thermoplastics or thermosets. The aspect ratio is a key factor in achieving high thermal conductivity on a particle in a preferred direction. Aligned carbon fibers are thermally conductive along the axial direction; however, in the radial direction the thermal conductivity is considerably less than the thermal conductivity in the axial direction.

The shape of the filler particles is important for thermal conductivity. Particles that comprise a high aspect ratio (length-to-width ratio) are typically used, meaning they are long and thin such as hexagonal or needle shapes. High aspect ratio particles allow for better heat transfer pathways through the material. Aspect ratios of greater than 3:1, preferably greater than 4:1, greater than 5:1, greater than 10:1 and greater than 20:1 are preferred. It is desirable for the filler particles to be oriented in the longitudinal direction AA'.

The thermally conductive materials may have a thermal conductivity of 10 to 3000 W/mK, 20 to 2500 W/mK, or 30 to 2000 W/mK in the longitudinal direction AA'.

Radiator 110 comes in several different forms, such as spacecraft structural panels, flat-plate radiators mounted to the side of the spacecraft, and panels deployed after the spacecraft is on orbit. Radiators reject heat by infrared (IR) radiation from their surfaces. The radiating power depends on the surface's emittance and temperature. The radiator 110 must reject both the spacecraft waste heat and any radiant-heat loads from the environment. Most radiators are therefore given surface finishes with high IR emittance to maximize heat rejection and low solar absorptance to limit heat from the sun.

In an embodiment, the optional first conduction link 103 and the optional second conduction link 109 may not be present. In this case, the electrical component 102 is in direct thermal communication to the component side 200 of the switchable thermal link 104. The radiator 110 is in direct thermal communication to radiator side 300 of the switchable thermal link 104. The connecting means can comprise any suitable manner, such as via the use of butt joints or other joints that can be formed through laser welding, brazing, friction stir welding, ultrasonic welding, or other suitable techniques. The connecting means may comprise adhesives, clips, snaps and pins. The electrical component 102 may be formed as an integral structure on the component side 200 of the switchable thermal link 104. The radiator 110 may be formed as an integral structure on the radiator side 300 of the switchable thermal link 104. The radiator side 300 of the switchable thermal link 104 may have a high IR emittance surface such as a coating, finish, or layer.

In an embodiment, the optional first conduction link 103 may be present and the optional second conduction link 109 may not be present. In this case, the electrical component 102 is in thermal communication to the component side 200 of the switchable thermal link 104 through the optional first conduction link 103. The radiator 110 is in direct thermal communication to radiator side 300 of the switchable thermal link 104.

In an embodiment, the optional first conduction link 103 may not be present and the optional second conduction link 109 may be present. In this case, the electrical component 102 is in direct thermal communication to the component side 200 of the switchable thermal link 104. The radiator 110 is in thermal communication to radiator side 300 of the switchable thermal link 104 through the optional second conduction link 109.

Figure 2:
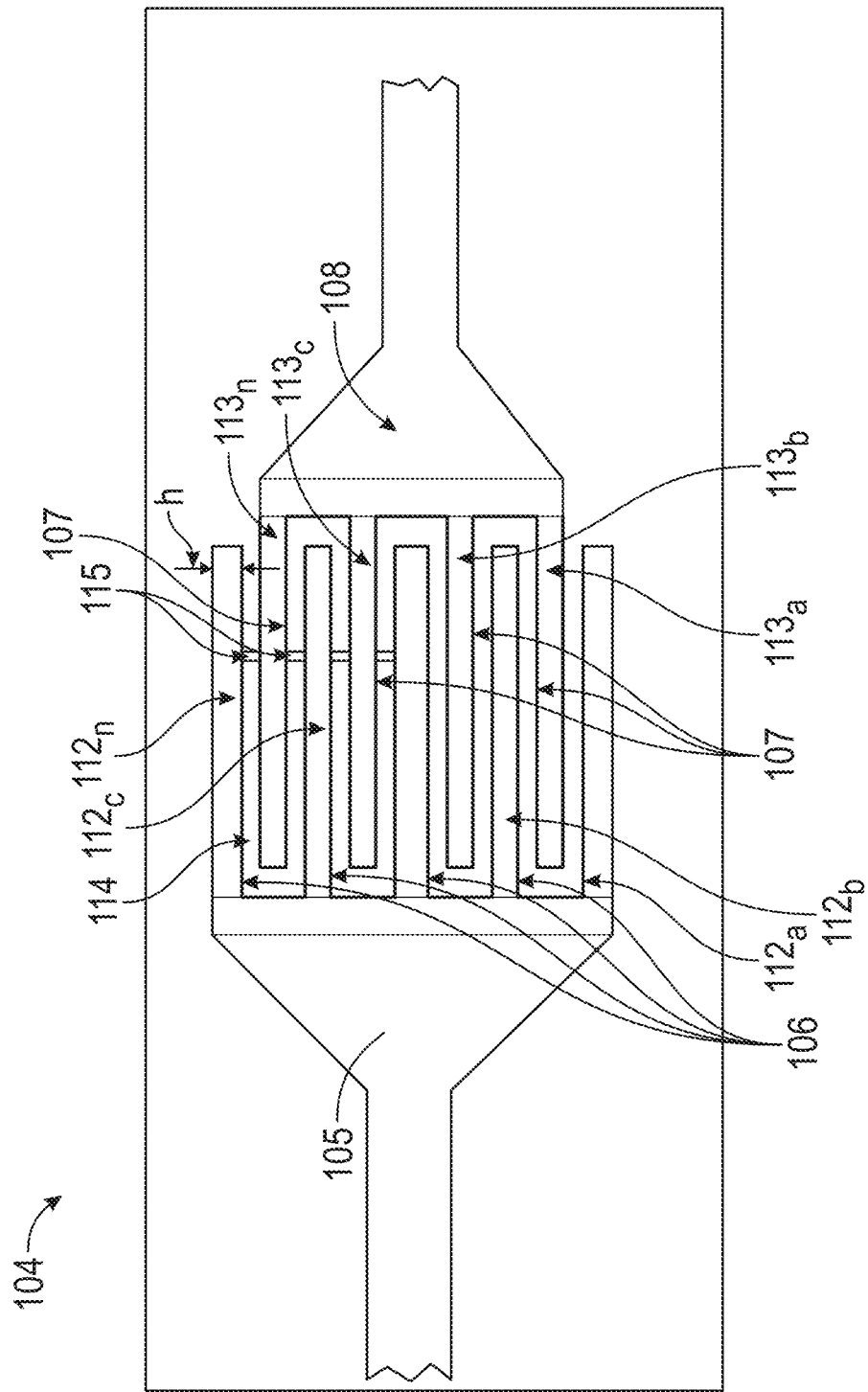
FIG. 2 depicts an exemplary embodiment of the thermally switchable link.

FIG. 2 illustrates a cross-section of the apparatus comprising the switchable thermal link 104. The switchable thermal link 104 comprises a first root 105 that has a plurality of first fins 112a to 112n protruding from the first root 105. The first fins 112a to 112n interlock with a plurality of second fins 113a to 113n. The plurality of second fins 113a to 113n protrude forth from a second root 108 that further contacts the second conduction link 109.

The first root 105 of the switchable thermal link 104 can have a variable emissive coating 106. The first root 105 is in thermal communication to radiator side 300 of the switchable thermal link 104 through interlocking fins. The fins overlap each other but do not touch (i.e., do not contact each other) as there is a gap 114 between the fins. In the gap 114, there can be an optional thermal insulative spacer 115. In an embodiment, the gap 114 can comprise one or more optional thermal insulative spacer 115. Radiator side 300 of the switchable thermal link can have a second emissive coating 107, which could be a fixed high emissivity coating or a variable emissivity coating.

Each of the fins can have the same or different emissive coating. The first root 105 and the second root 108 can have the same or different number of fins. Each first fin 112a through 112n is in emissive communication with two neighboring second fins and each second fin is in emissive communication with two neighboring first fins except for the outermost fins. The outmost first fin is in emissive communication with one neighboring second fin. The outmost second fin is in emissive communication with one neighboring first fin. The emissivity coating may be a variable emissivity coating, where the emissivity is variable based on the emissivity transition temperature, or the coating may be a fixed high emissivity coating.

Figure 6:
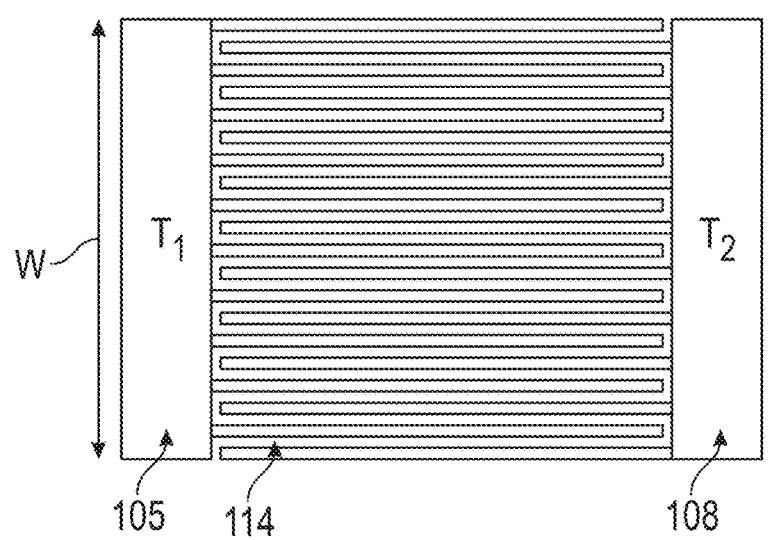
FIG. 6 depicts an exemplary embodiment the cross-section of the thermally switchable link.

As shown in FIG. 2, fins 112a and 112n protruding from the first root 105 are the outermost fins. FIG. 6 shows another cross section of the apparatus comprising the switchable thermal link 104. The first root 105 and second root 108 has a plurality of fins. Each root 105 and 108 has one fin that is the outermost fin. In an alternate embodiment, the second root 108 may have two fins that are the outmost fins.

The interlocking structure of the fins with a spacing between them enhances the effective heat transfer across the switchable thermal link. The gap 114 allows for radiative heat transfer. The alternating structure with the first fin 112a through 112n in communication with two neighboring second fins and each second fin 113a through 113n is in communication with two neighboring first fins maximizes the surface area of the fins and increases the effective heat transfer.

The optional thermal insulative spacer 115 can be used to keep the fins from touching as the gap 114 allows radiative heat transfer. The thermal insulative spacer 115 can be any material that provides thermal insulation capability. The thermal insulative materials can include one or more of the following silica aerogel, polyurethane, polystyrene, polyester, fiberglass, mineral wool, polymer based foams, ceramics, cellulose or cellulose derivatives, natural fibers, polyisocyanurate, or perlite.

Figure 7A:
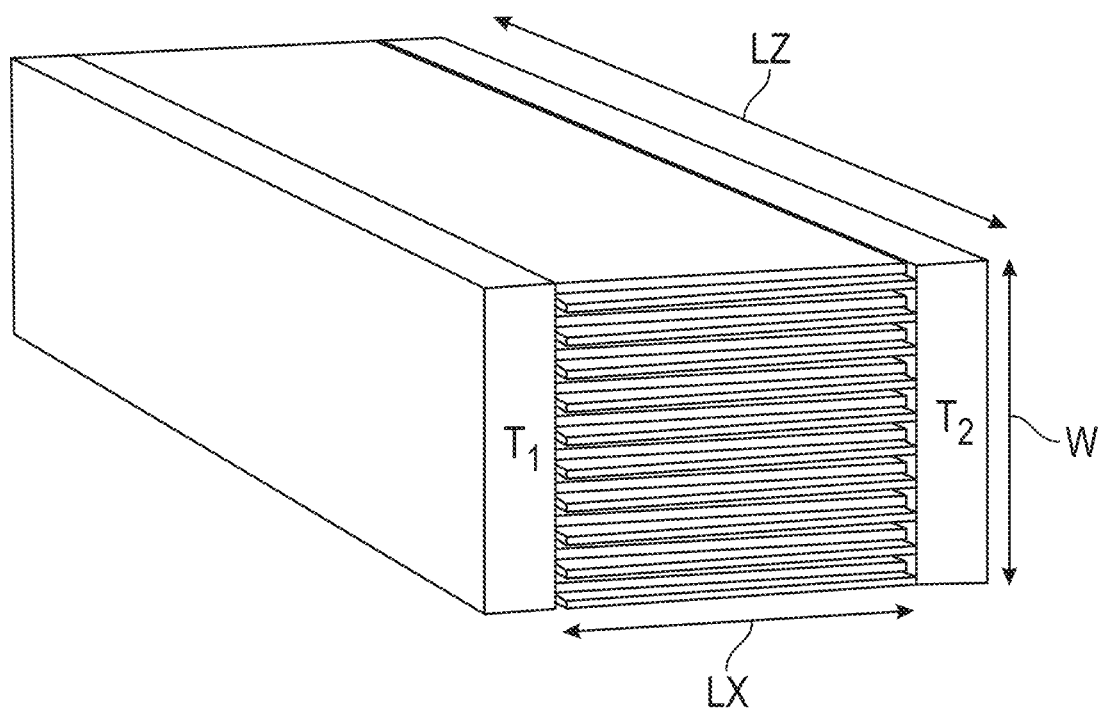
FIG. 7A depicts an exemplary embodiment of the thermally switchable link.

As shown in FIGS. 6 and 7A, the length of the fins is LX (see FIG. 7A) and transverses the space between the first root 105 and the second root 108. The fins are uniform in size and shape across the length LX. The gap 114 between each of the fins is the same over the entire length LX and width W. FIG. 7A illustrates a three-dimensional view of the switchable thermal link where LZ is length of the side.

Figure 8:
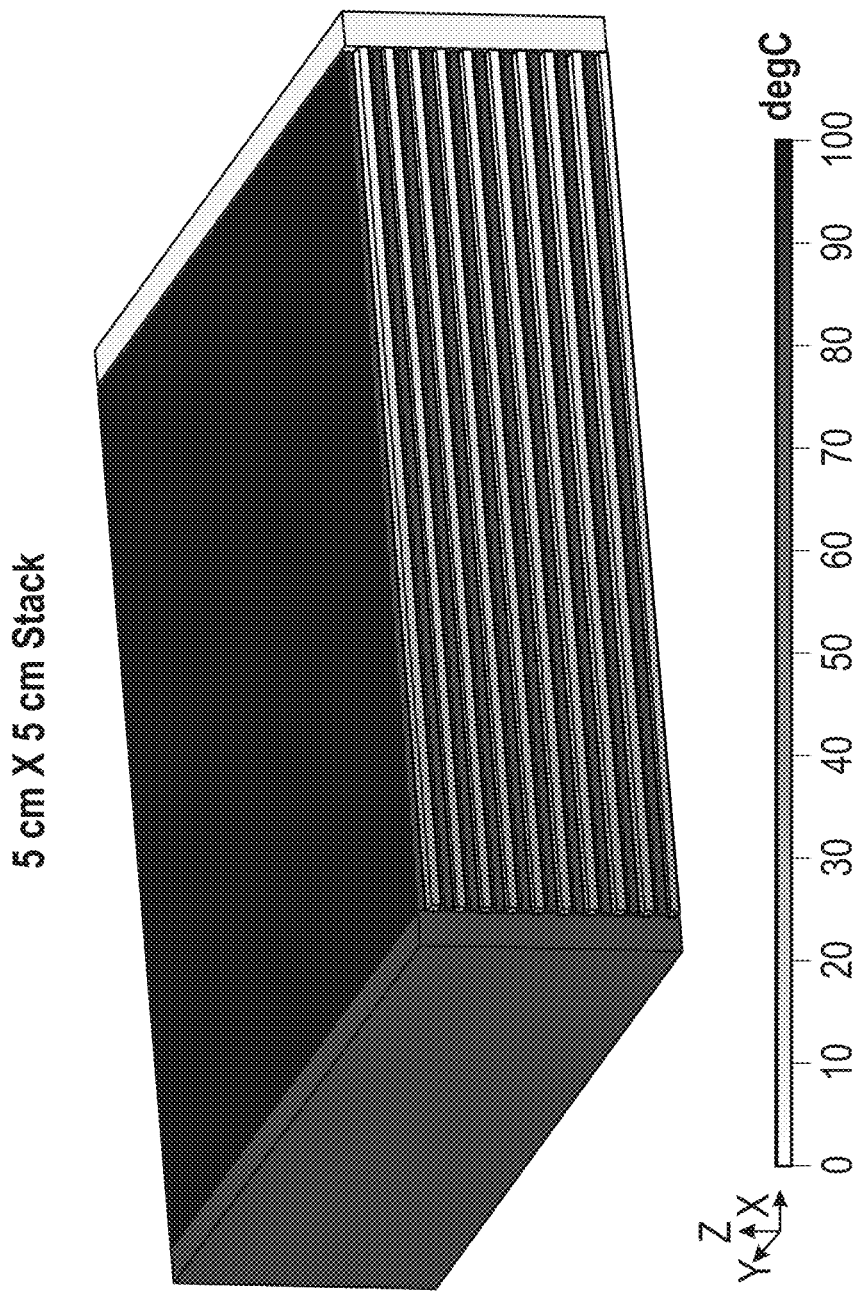
FIG. 8 depicts an exemplary embodiment of a thermal switchable link.

FIG. 8 is an example of the switchable thermal link 104. FIG. 8 illustrates where LX and LZ are each 5 cm.

The fins are surfaces that extend from an object to increase the rate of heat transfer to or from the environment by increasing the area available for thermal radiation. Fins have substantially large length and/or width dimensions with respect to their thickness dimensions, thereby providing relatively large surface area to volume ratios to facilitate heat transfer. Fin geometries can include straight, tapered, pin, triangular, rectangular, square, wavy, perforated, radial, serrated, louvered or offset strip. One-piece finned structures can be produced by extrusion, casting, forging, stamping, skiving, or milling.

The number of fins may be as low as 1 per millimeter, up to 1 to 2 fins per centimeter up to five to eight fins per centimeter, in some applications may require 1,200 fins per meter or any number in between. Fin thicknesses may range from 0.05 to 0.5 millimeter. Fin heights (W) and lengths (LX) (as shown in FIG. 7A) may range from 0.25 to 50 centimeter. The longer the fins LX, as shown in FIG. 7A, the more heat transfer for a given temperature difference between hot and cold sides of the thermal link. The larger the width W of the switch thermal link 104, the larger number of fins.

The fin thickness also impacts the structural stability of the switchable thermal link. Thicker fins offer better mechanical strength and can withstand deformation or damage better than thinner fins.

The variable emissivity coating exhibits first emissivity (i.e., relatively low emissivity) and reflective behavior at first temperatures ranges (i.e., relatively low temperatures ranges) and second emissivity (i.e., relatively high emissivity) exceeding the first emissivity at second temperatures ranges (i.e., relatively high temperature ranges) exceeding the first temperatures. The variable emissive coatings may include any material that can be used to control heat flow and regulate temperature. These materials may include thermochromic materials, electrochromic materials, self-shape or shape memory materials, and thin film phase transition materials also known as metal-insulator transition materials.

The first temperature can range from −100° C. to 40° C. and the second temperature can range from 75° C. to 200° C. The temperature ranges can vary based on the application and the temperature requirements of the electrical component. Most electrical systems can operate in the temperature range of −25° C. to 40° C.

Thermochromic materials are materials that change their color due to a change in temperature. These materials can include liquid crystals, leuco dyes, papers, polymers, inks, and inorganic compounds such as titanium dioxide, zinc sulfide, and zinc oxide. The transition temperature of the material can be tuned by doping or the addition of fillers. The dopants can be any material that lowers the transition temperature of the material to a practical range to energy efficiency. Dopants can include calcium, sodium, magnesium, potassium, tungsten, chromium, molybdenum, niobium, tantalum, gold, platinum, other similar materials and/or a combination thereof.

Electrochromic materials are materials that change their color or opacity in response to an electrical stimulus. These materials may include transition metal oxides such as tungsten trioxide.

Self-shape or shape memory materials are materials that are responsive to thermal changes. The emissivity of shape memory materials varies as a function of temperature. Shape memory alloys such as nickel-titanium (Nitinol) is an example of a thermos-responsive alloy. Polymers such as polytetrafluoroethylene (PFTE), polylactide (PLA), and ethylene-vinyl acetate (EVA) may be designed to be deformed at a lower temperature and then return to their original shape when heated above a transition temperature.

The variable emissivity coatings can include dielectric or semi-metallic layers and metal-insulator transition material (MIT) layers. The MIT layers are interleaved with the dielectric or semi-metallic layers to create nanostructures 301 with cross-sectional shapes. A nanostructure is a structure of intermediate size between microscopic and molecular structures. Nanostructures can have dimensions from 0.01 nanometers to 1000 nanometers.

Figure 3A:
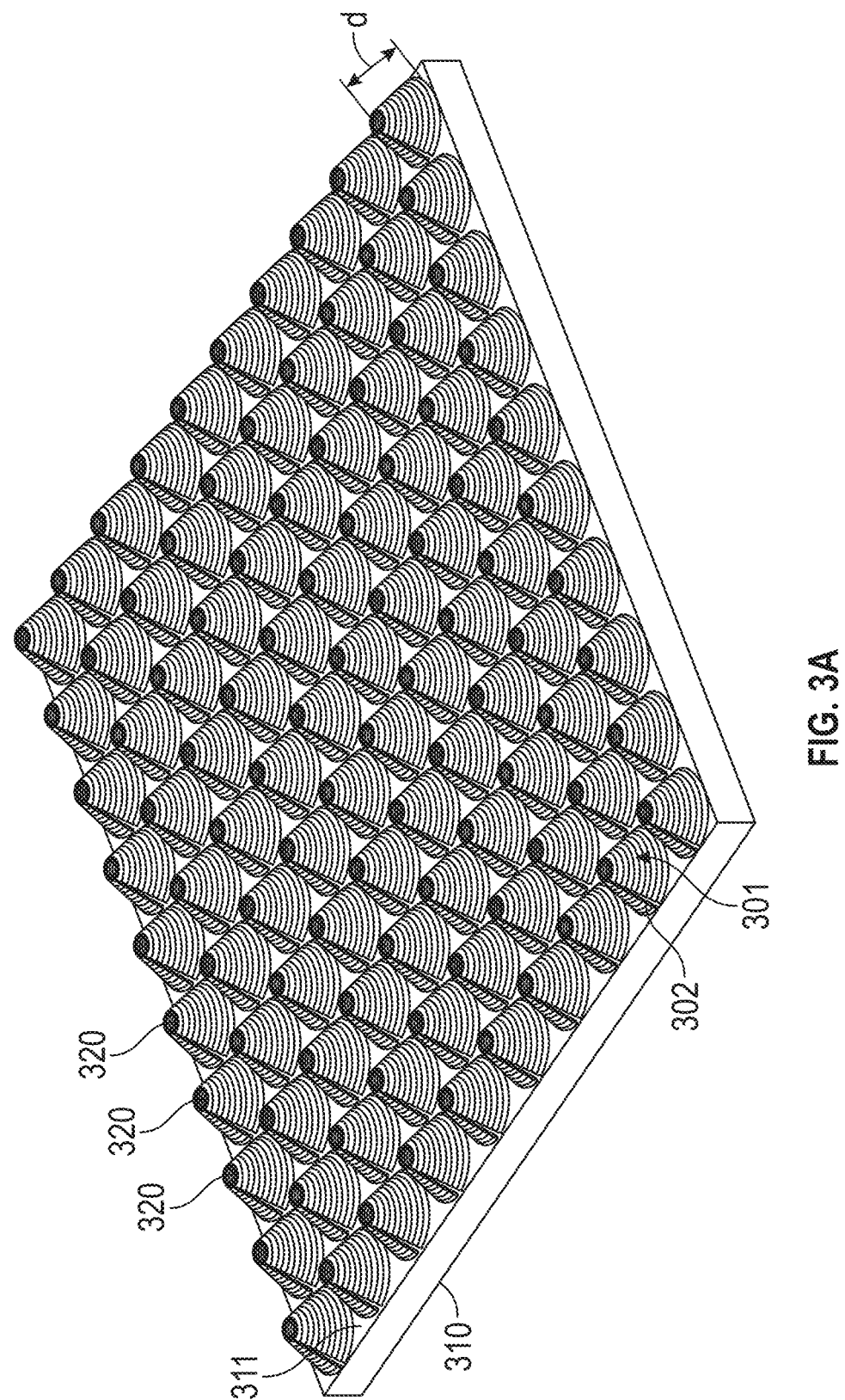
FIG. 3A is a view of a nanostructured variable emissive coating with C-shape cross-sectional shapes in similar orientation.
Figure 3B:
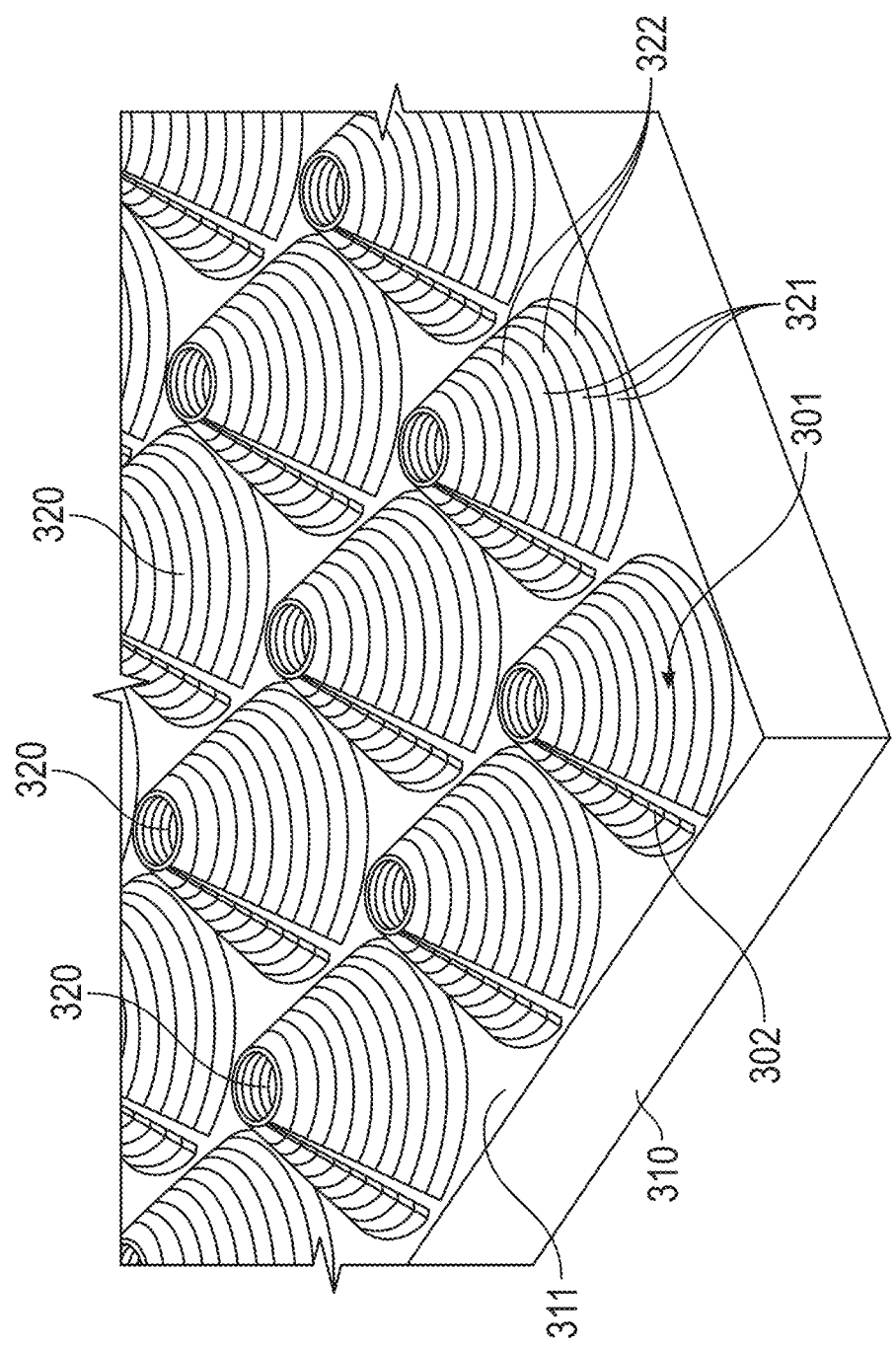
FIG. 3B is an enlarged view of a nanostructured variable emissive coating with C-shape cross-sectional shapes in similar orientation.
Figure 4A:
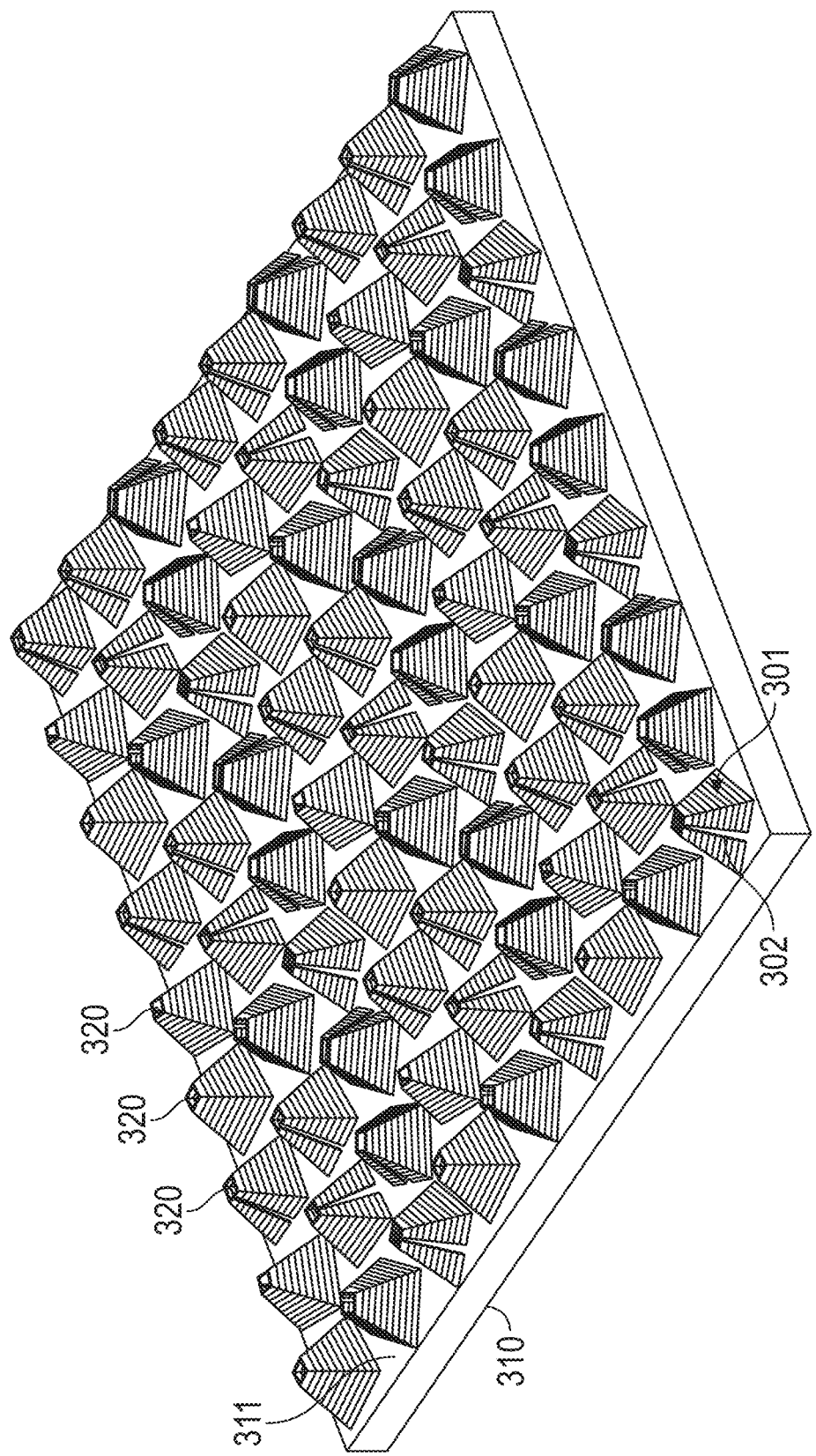
FIG. 4A is a view of a nanostructured variable emissive coating with horseshoe cross-sectional shapes in random orientation.
Figure 4B:
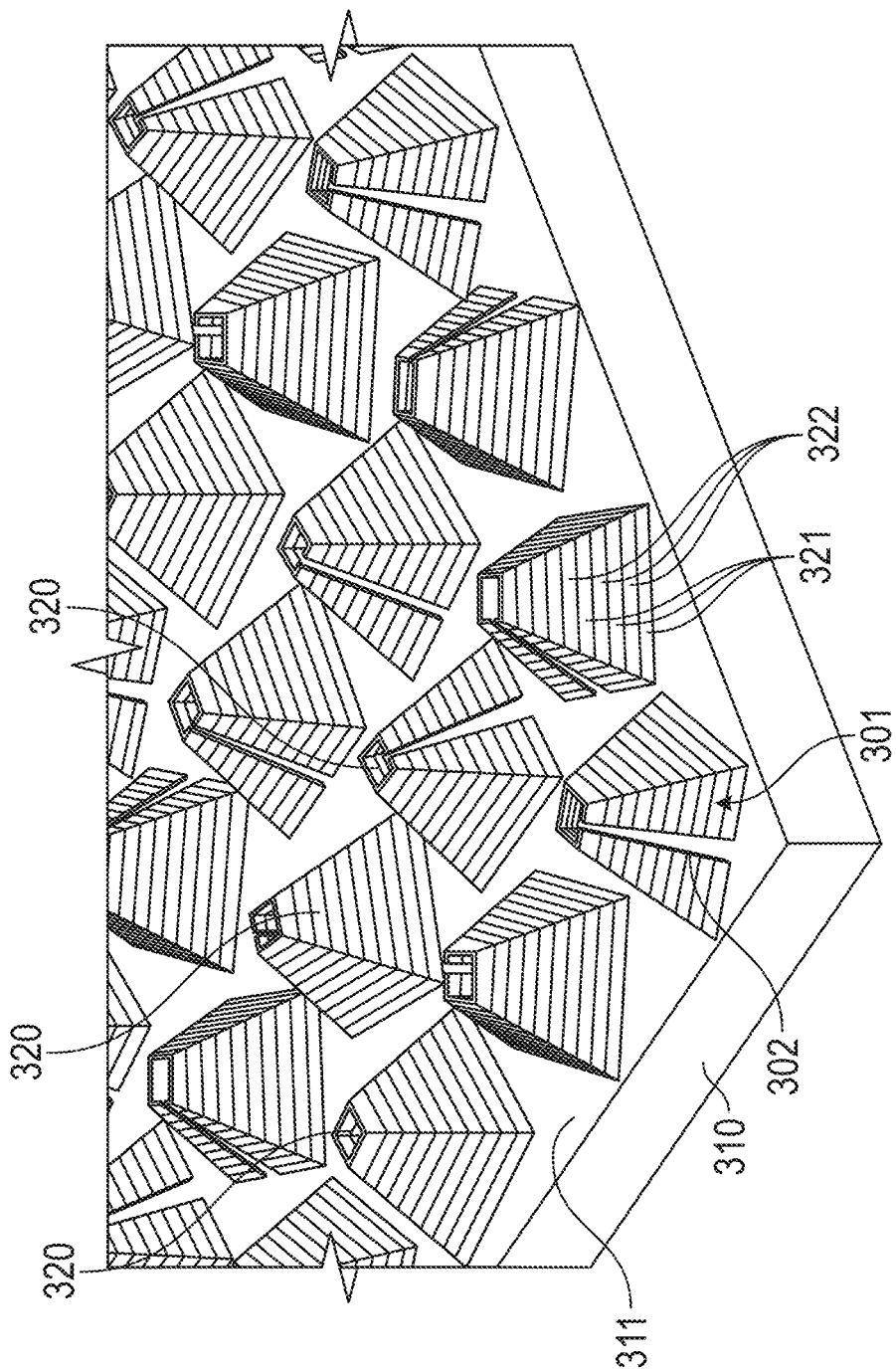
FIG. 4B is an enlarged view of a nanostructured variable emissive coating with horseshoe cross-sectional shapes in random orientation.
Figure 5:
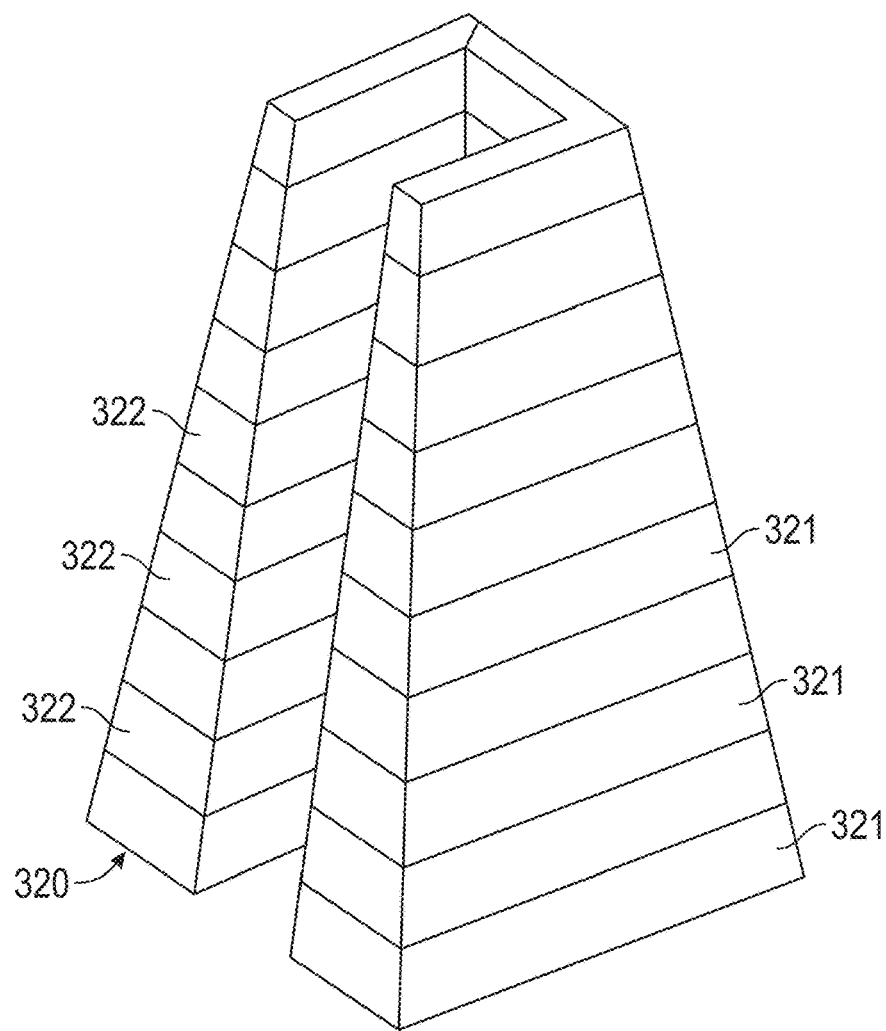
FIG. 5 is a view of a nanostructure with a horseshoe cross-sectional shape.

FIG. 3A, 3B, 4A, 4B, illustrate the variations of the nanostructures 301 for the variable emissivity coatings with additional reference to FIG. 5. The nanostructures 301 includes a substrate 310 with a surface 311 and multiple nanostructures 320 that are arrayed on the surface 311 of the substrate 310. Each nanostructure 301 has a height "d" from 0.01 nanometers to 1000 nanometers. Each nanostructure 320 has a decreasing cross-sectional area as shown in FIG. 5 with increasing height from the surface 311 of the substrate 310. Each nanostructure 320 includes dielectric or semi-metallic material layers 321 (i.e., materials with high impedance characteristics for example) and MIT material layers 322 that are each respectively interleaved with the dielectric or semi-metallic material layers 321. For each nanostructure 320, each MIT material layer 322 and each dielectric or semi-metallic material layer 321 has a cross-sectional shape that is characterized in that its electrical properties change in one or both of the metallic or dielectric material layers 321 and the MIT material layers 322 by exposure to a temperature change. The differences in the first emissivity and the second emissivity are due at least to the presence of MIT material layers 322. The MIT material of the MIT material layers 322 switches from being an insulator to an electrical conductor upon heating above a critical temperature. FIG. 3A is a nanostructured variable emissive coating with C-shape cross-sectional shapes in similar orientation. FIG. 3B is an enlarged view of a nanostructured variable emissive coating shown in FIG. 3A with C-shape cross-sectional shapes in similar orientation. FIG. 4A is a nanostructured variable emissive coating with horseshoe cross-sectional shapes in random orientation. FIG. 4B is an enlarged view of a nanostructured variable emissive coating shown in FIG. 4A with horseshoe cross-sectional shapes in random orientation.

The MIT material can include for example at least one or more of vanadium oxide, tungsten oxide, titanium dioxide, molybdenum oxide, doped versions of vanadium oxide, tungsten oxide, titanium dioxide, molybdenum oxide, germanium antimony telluride, chalcogenides, iron oxides, lanthanum cobaltite, niobium oxides, thermochromic materials that undergo a metal-insulator transition, other similar materials and/or a combination thereof. Each of these materials undergo similar phase transitions, albeit at different temperatures and with varying degrees of thermal hysteresis and durability. By incorporating the MIT material layers into the emissivity coatings, emissivity performance characteristics as a function of temperature are increased.

Dielectric materials are insulators and are poor conductors of electricity. Dielectric materials may include but are not limited to inorganic materials such as ceramic and glass, plastic films, rigid fibrous reinforced laminates, mica, elastomers or rubber-like materials. Semi-metallics may include but are not limited to boron, silicon, germanium, arsenic, antimony or tellurium.

The switchable thermal link can be designed based on the heat transfer needs. The size, shape, number of fins and gap 114 between the fins can be tailored based on the effective thermal conductivity. The interlocking fins should have a minimum gap of 0.01 millimeter such that the fins are not touching over the length (LX) (as shown in FIG. 7A). The gap should be no large than 100 millimeters.

When the electronics are off, minimal heat is transferred through the switchable thermal link. The variable emissive coating is in the low emissivity state as the temperature is less than the switchable emissivity temperature. When the coating is in the low emissivity state, the amount of heat that can be transported across the gaps between fins is greatly reduced.

When the electronics are on, high amount of heat is transferred through the switchable thermal link. The variable emissive coating is in the high emissivity state as the temperature is greater than the switchable emissivity transition temperature. When the coating is in the high emissivity state, heat can be transported by radiation across the gaps between the fins.

FIGS. 6 and 7A illustrate the interlocking fin array. In this example, the first root 105 and the second root 108 contain the same number of fins N. The width is W and the length of the sides are LX and LZ.

The total width of the array can be calculated by:

$$W = 2NLZ + (2N-1)*\text{gap}$$

The radiative heat transfer can be calculated:

$$Q_{12rad} = (2N-1)*A_{rad}\varepsilon\sigma(T_2^4 - T_1^4)$$

where $$A_{rad} = \text{fin area} = (LX * LZ)$$

$\varepsilon$ = is the emissivity of the surface (a value between 0 and 1)

Figure 7B:
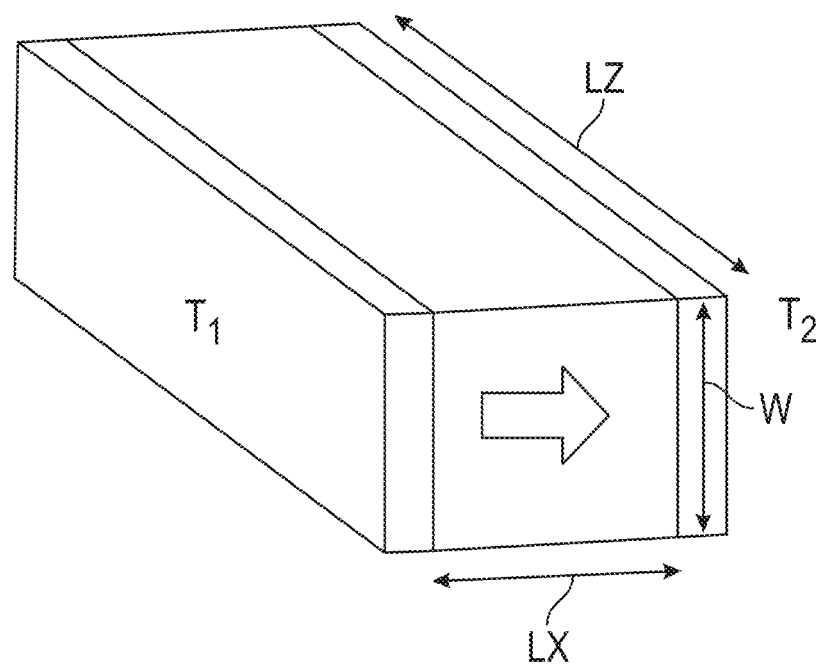
FIG. 7B depicts solid block of material with width W and length of sides LX and LZ.

$\sigma$ = is the Stefan – Boltzmann constant $(5.67 \times 10^{\wedge} - 8W/m^{\wedge}2K^{\wedge}4)$ The conductive heat transfer through a solid block of material with width W and length of sides LX and LZ (as shown in FIG. 7B) can be calculated:

$$Q_{12keff} = k_{eff}A_k\frac{(T_2 - T_1)}{LX}$$

where $$A_k = \text{effective heat trasnfer area} = (W * LZ)$$

The effective thermal conductivity can be calculated by equating the radiative heat transfer with the expression for the thermal conduction as follows:

$$Q_{12keff} = Q_{12rad}$$

$$k_{eff}A_k\frac{(T_2 - T_1)}{LX} = (2N-1)*A_{rad}\varepsilon\sigma(T_2^4 - T_1^4)$$

$$k_{eff}(W*LZ)\frac{(T_2 - T_1)}{LX} = (2N-1)*(LX*LZ)\varepsilon\sigma(T_2^4 - T_1^4)$$

$$k_{eff} = \frac{(2N-1)*(LX^2)\varepsilon\sigma}{W}\frac{(T_2^4 - T_1^4)}{(T_2 - T_1)}$$

FIG. 8 depicts exemplary embodiment of the thermal switchable link with different cross-sections. The image displays a high emissive state where the emissivity is 0.95. FIG. 8 shows a 5 centimeter by 5-centimeter stack. The temperature difference of the two ends extends through the fins. The pairs of hot and cold fins transfer heat via thermal radiation.

The longer the fin, the larger the heat transfer area and thus the higher the rate of heat transfer from the fin; however, the fin efficiency decreases with increasing fin length LX because of the decrease in the fin temperature with length LX. By increasing the surface area of the fin, the heat transfer rate increases by a sufficient degree.

Overall, increasing the length of a heat transfer fin will provide a greater improvement in heat transfer than increasing its thickness; however, a certain level of thickness is still required for structural integrity.

Figure 9:
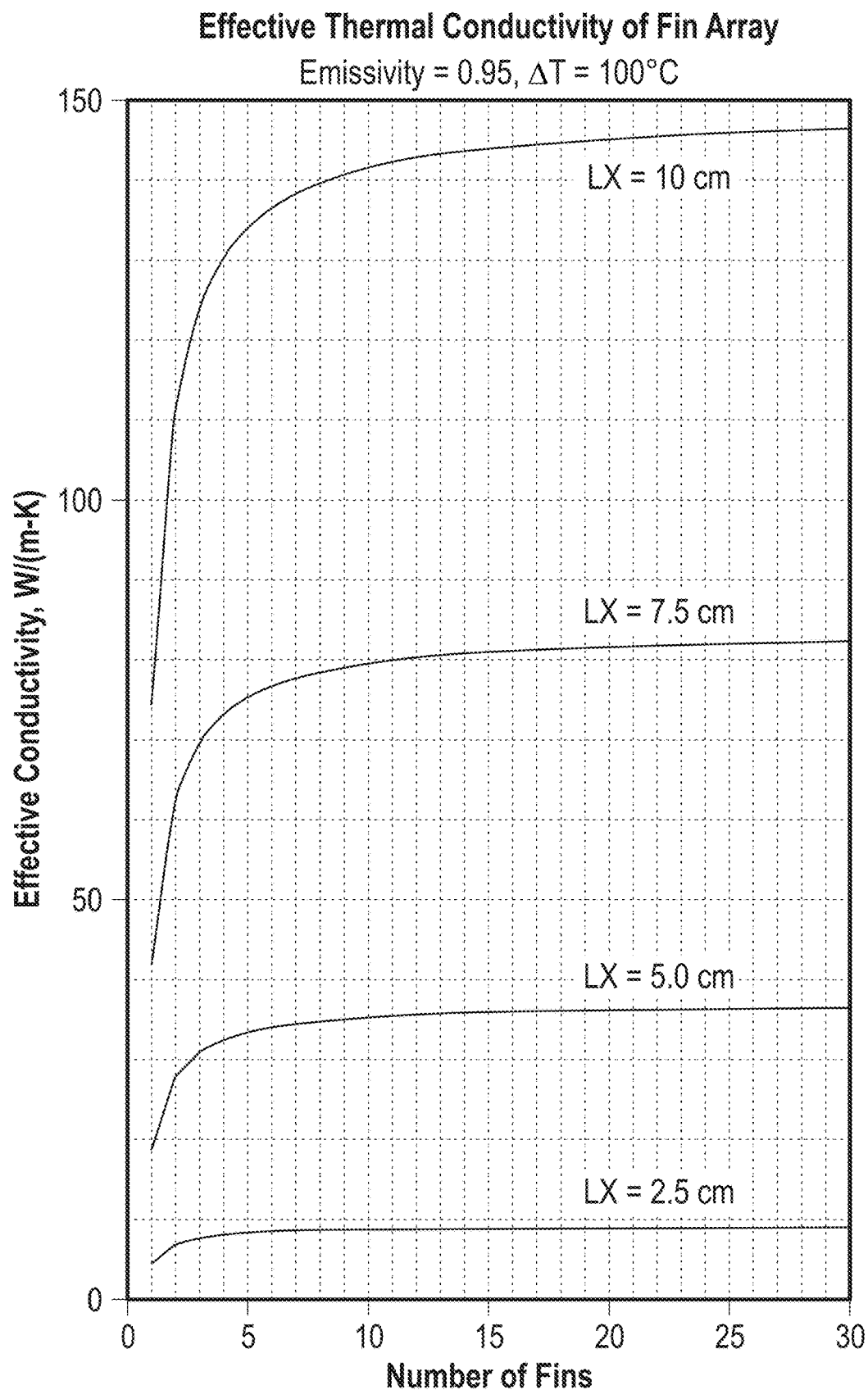
FIG. 9 depicts the effective thermal conductivity of the thermally switchable link in FIG. 7A with a high emissive coating.
Figure 10:
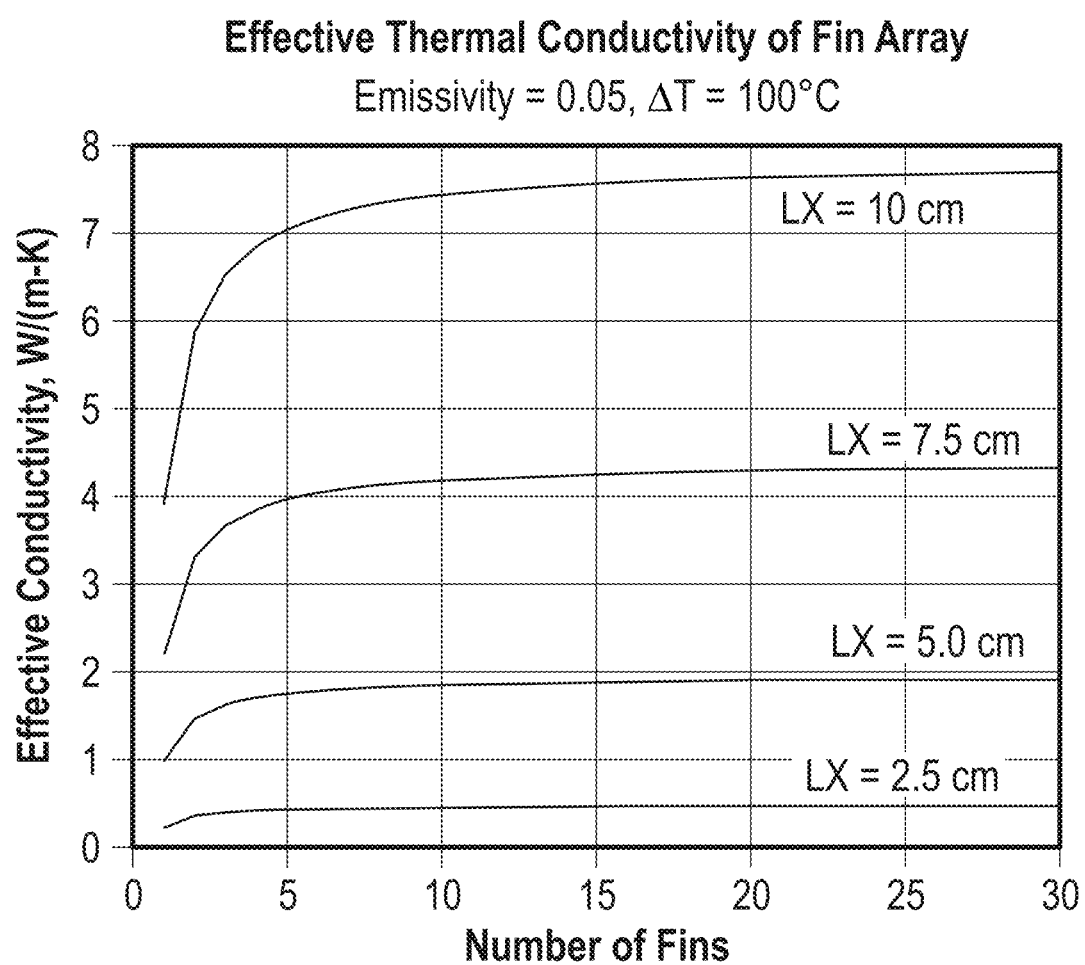
FIG. 10 depicts the effective thermal conductivity of the thermally switchable link in FIG. 7A with a low emissive coating.

As illustrated in FIGS. 9 and 10, the effective thermal conductivity of the fin array (thermal link) can be tailored by modulating the emissivity coating on the fins. FIG. 9 depicts a high emissive state with the emissivity of the coating on the fins equal to 0.95 while FIG. 10 shows the low emissive state with the emissivity of the coating on the fins equal to 0.05. Both figures display four curves, each of which is for a different value of LX. Each curve displays the effective thermal conductivity of the thermal link as a function of the number of fins, assuming the hot side is at 100° C. and the cold side is at 0° C. As shown by the figures, as you increase the fin length LX (shown in FIG. 7A), the effective conductivity of the array increases.

What is claimed is:

1. An apparatus comprising:
   a component side comprising:
      a heater,
      an electrical component,
      an first conduction link; and
      a first portion of a switchable thermal link;
   a radiator side comprising:
      a radiator,
      an second conduction link; and
      a second portion of a switchable thermal link,
         wherein the first portion of the switchable thermal link and the second portion of the switchable link are in operative thermal communication with the component side and the radiator side respectively; and wherein the first portion of the switchable thermal link and the second portion of the switchable thermal link are reversibly attachable and detachable, and
         wherein the switchable thermal link is operative to receive and radiate thermal energy from a component side to a radiator side.

2. The apparatus according to claim 1, wherein the first portion of the switchable thermal link comprises one or more interlocking fins, and wherein the second portion of the switchable thermal link comprises one or more interlocking fins that mate with each other, and wherein the mating interlocking fins are separated by a gap.

3. The apparatus according to claim 2, wherein the one or more interlocking fins comprises a variable emissivity coating on a surface the one or more interlocking fins.

4. The apparatus according to claim 2, wherein the gap is more than 10 micrometers.

5. The apparatus according to claim 2, wherein the gap further comprises one or more thermal insulative spacer to keep the fins from touching.

6. The apparatus of claim 3, wherein the variable emissivity coating is a nanostructured material.

7. The apparatus according to claim 4, wherein the nanostructured material comprises a dielectric or semi-metallic material layer; and a metal-insulator transition material layer respectively interleaved between successive dielectric layers, between successive semi-metallic material layers, or between a dielectric layer and a semi-metallic layer.

8. The apparatus according to claim 6, wherein each metal-insulator transition material layer and each dielectric or semi-metallic material layer of each nanostructure has a cross-sectional shape characterized in that a change in an electrical property of at least one of the dielectric material layers, the semi-metallic material layer or the metal-insulator transition material layer occurs upon exposure to a temperature change.

9. The apparatus according to claim 4, wherein the nanostructured material exhibits a first emissivity at a first temperature and a second emissivity exceeding the first emissivity at a second temperature exceeding the first temperature.

10. The apparatus according to claim 5, wherein a metal-insulator transition material of the metal-insulator transition material layer comprises at least one of vanadium oxide, tungsten oxide, titanium dioxide, molybdenum oxide, and a combination thereof.

11. The apparatus according to claim 1, where the operative communication includes emissive communication.

12. A flight vehicle comprising the apparatus of claim 1.

13. A method, wherein the method includes:
   transmitting heat from a component side to a radiator side in a space vehicle, the component side comprising:
      a heater;
      an electrical component;
      an first conduction link; and
      a first portion of a switchable thermal link;
   the radiator side comprising:
      a radiator;
      an second conduction link; and
      a second portion of the switchable thermal link,
         wherein the first portion of the switchable thermal link and the second portion of the switchable link are in operative thermal communication with the component side and the radiator side respectively; and wherein the first portion of the switchable thermal link and the second portion of the switchable thermal link are reversibly attachable and detachable, and
         receiving thermal energy from a component side;
         transmitting the thermal energy to the radiator side; and
         irradiating heat from the radiator side into space.

14. The method of claim 12, wherein the operative communication includes emissive communication.

15. The method according to claim 12, wherein the first portion of the switchable thermal link comprises one or more interlocking fins, and wherein the second portion of the switchable thermal link comprises one or more interlocking fins that mate with each other, and wherein the mating interlocking fins are separated by a gap.

16. The method according to claim 14, wherein the one or more interlocking fins comprises a variable emissivity coating on a surface the one or more interlocking fins.

17. The method according to claim 15, wherein the variable emissivity coatings is a nanostructured material, and wherein the nanostructured material exhibits a first emissivity at a first temperature and a second emissivity exceeding the first emissivity at a second temperature exceeding the first temperature.

18. The method according to claim 15, wherein the nanostructured material comprises a dielectric or semi-metallic material layer; and a metal-insulator transition material layer respectively interleaved between successive dielectric layers, between successive semi-metallic material layers, or between a dielectric layer and a semi-metallic layer.

19. The method according to claim 16, wherein each metal-insulator transition material layer and each dielectric or semi-metallic material layer of each nanostructure has a cross-sectional shape characterized in that a change in an electrical property of at least one of the dielectric material layers, the semi-metallic material layer or the metal-insulator transition material layer occurs upon exposure to a temperature change.

\* \* \* \* \*